(12) United States Patent
Yagati et al.

(10) Patent No.: US 8,516,903 B2
(45) Date of Patent: Aug. 27, 2013

(54) MULTI-AXIS ELECTRONIC MODULE MOUNTING ADJUSTMENT ASSEMBLY

(75) Inventors: Veeresh Shivaprakash Yagati, Haveri (IN); Gautham Ramamurthy, Bangalore (IN); Max Jarrell, Fenton, MI (US); Sivaprakash Eswaran, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 197 days.

(21) Appl. No.: 13/171,247

(22) Filed: Jun. 28, 2011

(65) Prior Publication Data

US 2013/0000419 A1    Jan. 3, 2013

(51) Int. Cl.
*G01L 3/02* (2006.01)

(52) U.S. Cl.
USPC ............. 73/862.321; 73/862.08; 73/856

(58) Field of Classification Search
USPC ............. 73/760, 856, 862.08, 862.321
See application file for complete search history.

(56) References Cited

U.S. PATENT DOCUMENTS

| 3,891,870 | A | * | 6/1975 | Corbett ...................... 310/338 |
| 4,601,452 | A | * | 7/1986 | Rando ...................... 248/187.1 |
| 5,087,879 | A | * | 2/1992 | Sugifune et al. ......... 324/207.25 |
| 5,749,533 | A | * | 5/1998 | Daniels ...................... 242/287 |
| 6,343,580 | B2 | * | 2/2002 | Uchida ...................... 123/90.17 |
| 2005/0203531 | A1 | * | 9/2005 | Lakin et al. ...................... 606/87 |
| 2010/0171014 | A1 | * | 7/2010 | Stemple ...................... 248/201 |

* cited by examiner

*Primary Examiner* — Max Noori
(74) *Attorney, Agent, or Firm* — Ingrassia Fisher & Lorenz, P.C.

(57) ABSTRACT

A mounting assembly for adjusting the position of an electronic module along a first axis, a second axis, and a third axis, in which the first, second, and third axes are all perpendicular to each other, includes a first adjustment block, a second adjustment block, and a third adjustment block. The first adjustment block is movable along the first axis and the second axis and is mounted against movement along the third axis. The second adjustment block is coupled to the first adjustment block, is movable along the second axis, and is mounted against movement along the first and third axes. The third adjustment block is disposed between the first adjustment block and the second adjustment block, is movable along the second and third axes, and is mounted against movement along the first axis.

10 Claims, 7 Drawing Sheets

MULTI-AXIS ELECTRONIC MODULE MOUNTING ADJUSTMENT ASSEMBLY

TECHNICAL FIELD

The present invention generally relates to adjustable mounting assemblies, and more particularly relates to a multi-axis mounting adjustment assembly for an electronic module, such as a torque measurement system stator.

BACKGROUND

Numerous and varied methods have been derived for determining the torque on a rotating system. One example of a known torque measurement system includes a rotor element, a stator, and a signal processing module. The rotor element is mounted on a rotating shaft and thus rotates with the shaft. The rotor element is configured to sense one or more parameters representative of torque on the rotating shaft, and includes appropriate circuitry and an antenna that, among other things, transmits radio frequency (RF) signals representative of the one or more sensed parameters. The stator is mounted adjacent to the rotor element and includes one or more antennae. The stator, via the one or more antennae, receives the RF signals transmitted by the rotor element and may additionally supply power to the rotor element. The stator supplies torque measurement data to the signal processing module. The signal processing module receives and further processes the torque measurement data.

The stator typically needs to be mounted and aligned with respect to the rotor element in three perpendicular dimensions. Relatively precise alignment of the stator ensures consistent signal transfer between the rotor element and stator, and additionally ensures that the torque measurement system exhibits appropriate accuracy and performance.

The above-described torque measurement system is generally safe, reliable, and robust. However, it can suffer certain drawbacks. For example, end-users typically provide their own mounting hardware for the stator, which may not facilitate sufficiently accurate and precise alignment of the stator.

Hence, there is a need for a device that facilitates relatively accurate and precise alignment of a stator to a rotor element in a torque measurement system and/or a device that facilitates adjusting the position of any other type of electronic module in multiple dimensions, such as along a first, second, and third perpendicular axes. The present invention addresses at least this need.

BRIEF SUMMARY

In one embodiment, a mounting assembly for adjusting the position of an electronic module along a first axis, a second axis, and a third axis, in which the first, second, and third axes are all perpendicular to each other, includes a first adjustment block, a second adjustment block, and a third adjustment block. The first adjustment block is movable along the first axis and the second axis and is mounted against movement along the third axis. The second adjustment block is coupled to the first adjustment block, is movable along the second axis, and is mounted against movement along the first and third axes. The third adjustment block is disposed between the first adjustment block and the second adjustment block, is movable along the second and third axes, and is mounted against movement along the first axis. The first adjustment block moves along the first axis in response to movement of the third adjustment block along the third axis, and the first and third adjustment blocks simultaneously move along the second axis in response to, and with, movement of the second adjustment block along the second axis.

In another embodiment, a torque measurement system includes a rotor element, a signal processing module, a stator, and a mounting assembly. The rotor element is configured to mount on a rotating shaft, and is further configured to sense torque generated by the rotating shaft and generate and supply radio frequency (RF) signals representative of the sensed torque. The signal processing module is coupled to receive and process signals representative of the sensed torque. The stator is coupled to the signal processing module and is in wireless communication with the rotor element. The mounting assembly is coupled to the stator and is configured to adjust the position thereof relative to the rotor element and along first, second, and third perpendicular axes. The mounting assembly includes a first adjustment block, a second adjustment block, and a third adjustment block. The first adjustment block is movable along the first axis and the second axis and is mounted against movement along the third axis. The second adjustment block is coupled to the first adjustment block, is movable along the second axis, and is mounted against movement along the first and third axes. The third adjustment block is disposed between the first adjustment block and the second adjustment block, is movable along the second and third axes, and is mounted against movement along the first axis. The first adjustment block moves along the first axis in response to movement of the third adjustment block along the third axis, and the first and third adjustment blocks simultaneously move along the second axis in response to, and with, movement of the second adjustment block along the second axis.

In yet another embodiment, a torque measurement system, a torque measurement system includes a rotor element, a signal processing module, a stator, and a mounting assembly. The rotor element is configured to mount on a rotating shaft, and is further configured to sense torque generated by the rotating shaft and generate and supply radio frequency (RF) signals representative of the sensed torque. The signal processing module is coupled to receive and process signals representative of the sensed torque. The stator is coupled to the signal processing module and is in wireless communication with the rotor element. The mounting assembly is coupled to the stator and is configured to adjust the position thereof relative to the rotor element and along first, second, and third perpendicular axes. The mounting assembly includes a housing, a mounting bracket, a first adjustment block, a second adjustment block, and a third adjustment block. The housing is mounted against movement, has an inner surface that defines an inner volume, and has an opening into the inner volume. The mounting bracket is coupled to the stator, is disposed over the opening, and is movable relative to the housing. The first adjustment block is disposed within the inner volume of the housing and is coupled to the mounting bracket. The first adjustment block is movable along the first axis and the second axis and is mounted against movement along the third axis. The second adjustment block is disposed within the inner volume of the housing and is coupled to the first adjustment block. The second adjustment block is movable along the second axis and is mounted against movement along the first and third axes. The third adjustment block is disposed within the inner volume of the housing and between the first adjustment block and the second adjustment block. The third adjustment block is movable along the second and third axes and is mounted against movement along the first axis. The first adjustment block, the mounting bracket, and the stator move along the first axis in response to movement of the third adjustment block along the third axis, and the first adjustment block, the third adjustment block, the mounting bracket, and the stator simultaneously move along the second axis in response to and with movement of the second adjustment block along the second axis.

Furthermore, other desirable features and characteristics of the adjustment assembly will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

With the above in mind, it is noted that although embodiments are described as being implemented with a torque measurement system, the described embodiments may be implemented with any one of numerous other types of systems and devices.

Figure 1:
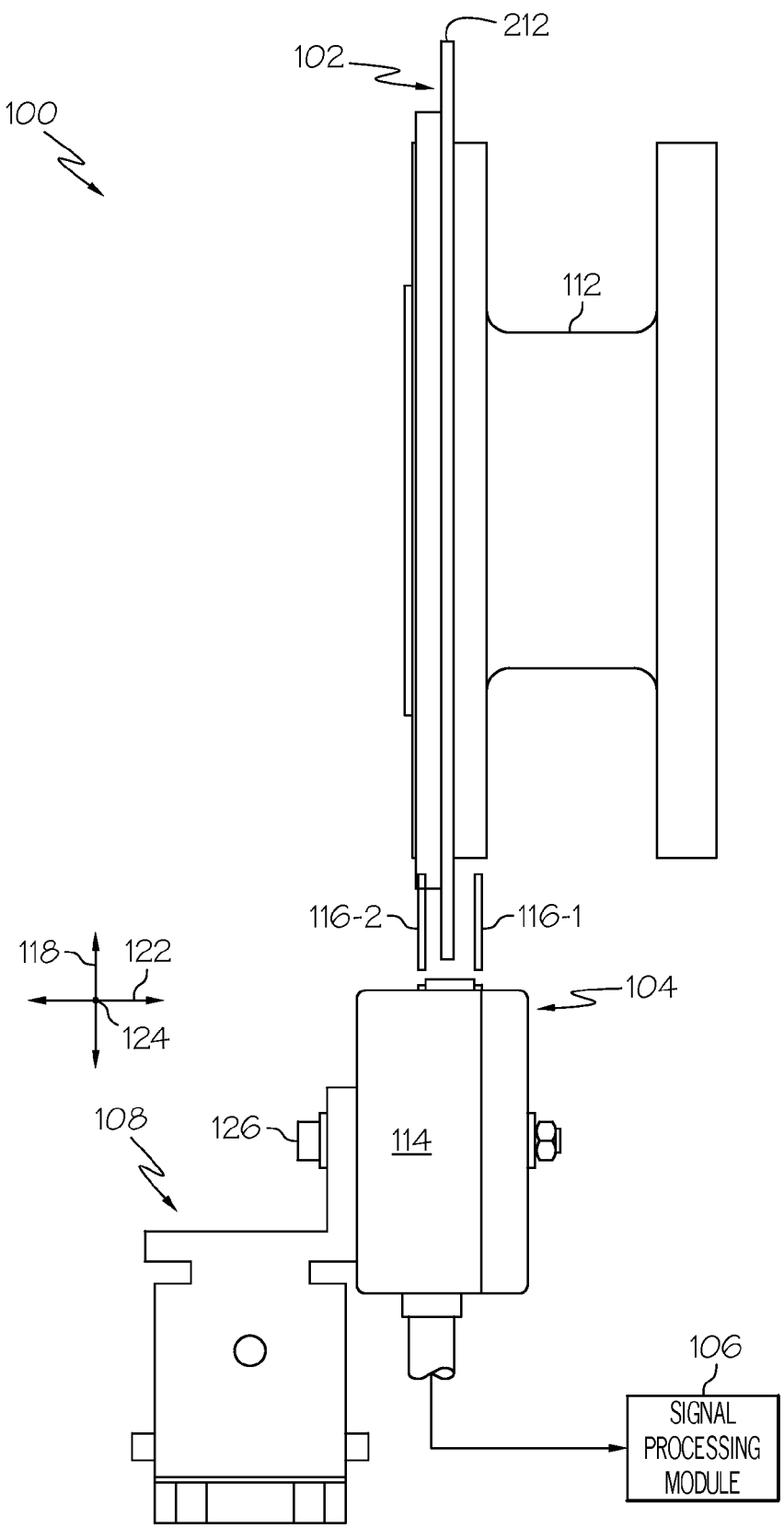
FIG. 1 depicts a side view of one embodiment of a portion of a torque measurement system.
Figure 2:
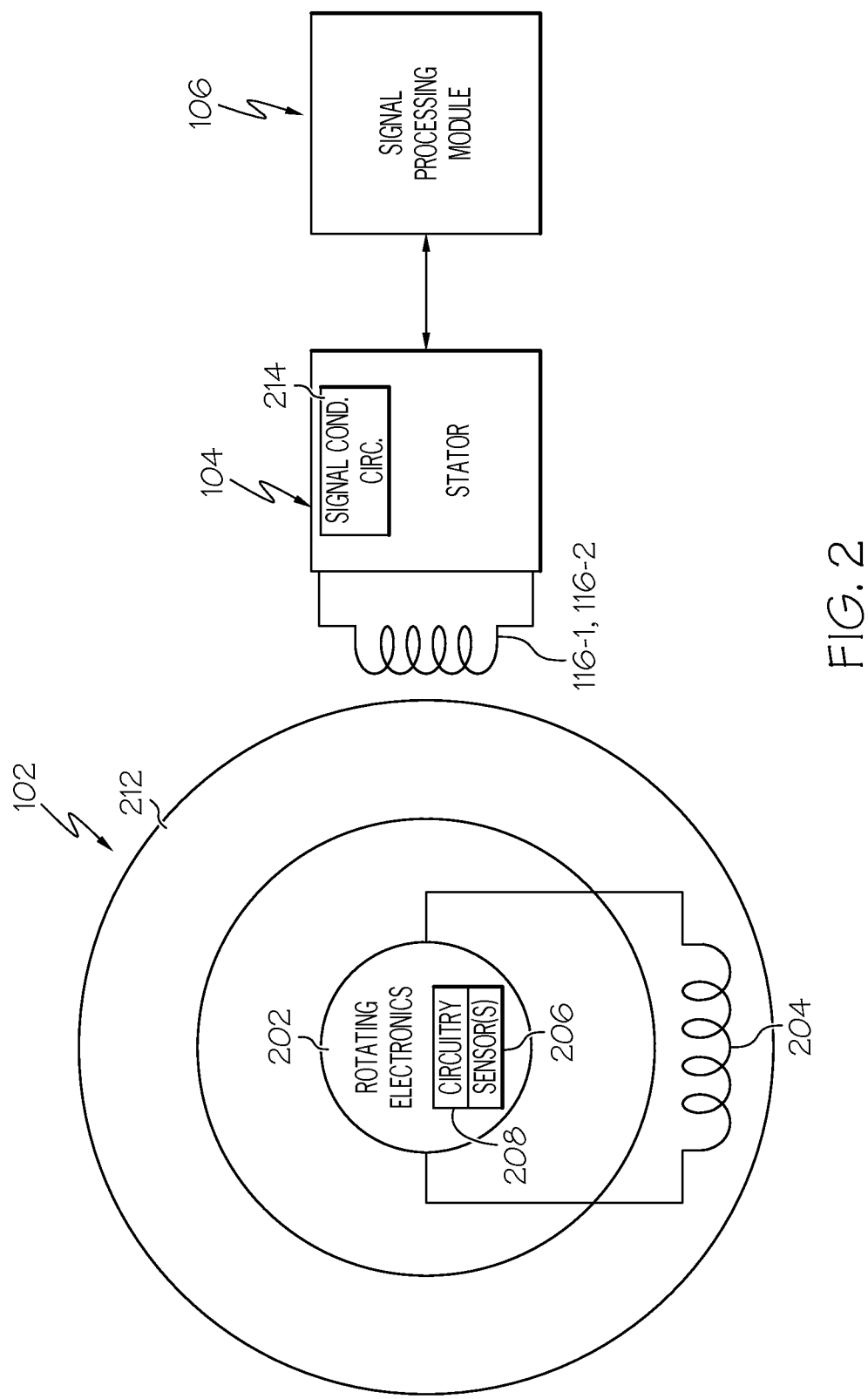
FIG. 2 depicts a schematic representation of the torque measurement system depicted in FIG. 1.

Turning now to FIGS. 1 and 2, a physical implementation and a schematic representation, respectively, of an exemplary embodiment of a torque measurement system 100 are depicted. The depicted torque measurement system 100 includes a rotor element 102, a stator 104, a signal processing module 106, and a mounting assembly 108. As FIG. 1 depicts, the rotor element 102 is mounted on, and thus rotates with, a rotating shaft 112. The rotor element 102 is configured to sense the torque generated by the rotating shaft 112, and to generate and supply radio frequency (RF) signals representative of the sensed torque. To do so, as FIG. 2 depicts, the rotor element 102 includes rotating electronics 202 and a rotating antenna 204. The rotating electronics 202 may be variously configured, but preferably includes one or more sensors 206 that are configured to sense torque and/or any one of numerous other rotation-related parameters. The rotating electronics 202 additionally includes circuitry 208 that is configured to modulate the sensed torque and/or other parameters using an RF carrier signal and transmit modulated RF signals via the rotating antenna 204.

The antenna 204 is coupled to receive the modulated RF signals from the rotating electronics 202 and is configured, upon receipt thereof, to emit the modulated RF signals. The rotating antenna 204 may be mounted, for example, on a printed circuit board 212 (also visible in FIG. 1) that is coupled to, and thus rotates with, the rotating shaft 112. The rotating antenna 204, which may be implemented using any one of numerous known RF antenna configurations, emits the modulated RF signals, which are in turn received by the stator 104.

The stator 104 is in wireless communication with the rotor element 102, and receives the modulated RF signals emitted from the rotating antenna 204. The stator 104, at least in the depicted embodiment, is disposed within a housing 114 and includes two antennae 116—a first antenna 116-1 and a second antenna 116-2—that extend from the housing 116. The antennae 116, which may be implemented using any one of numerous known RF antenna configurations, are disposed proximate the rotating antenna 204. The antennae 116 may not only receive the modulated RF signals emitted from the rotating antenna 204, but may also, at least in some embodiments, emit RF power signals that may be used to electrically power the rotating electronics 202.

As FIG. 2 depicts, the stator 104 additionally includes signal conditioning circuitry 214. The signal conditioning circuitry 204, which may be variously implemented, is configured to at least demodulate the modulated RF signals received by one or both antennae 116, and supply demodulated sensor signals to the signal processing module 106. The signal conditioning circuitry 204 may also, as alluded to above, be configured to generate RF power signals to be supplied, via one or both antennae 116, to the rotating electronics 202.

The signal processing module 106 is coupled to receive and process the demodulated sensor signals, which are representative of the sensed torque and/or other parameter(s). The signal processing module 106 may supply processed to one or more non-illustrated external systems or devices for display and/or further processing. It will be appreciated that the signal processing module 106 may be variously implemented to carry out its functionality, and may receive the demodulated sensor signals via a wired or wireless connection with the stator 104.

Referring once again to FIG. 1, it is seen that the stator 104 is coupled to the mounting assembly 108. As may be appreciated, the stator 104 is preferably mounted and aligned with respect to the rotor element 102 with a relatively high degree of precision to ensure consistent signal transfer with the rotor element 102, and to ensure the torque measurement system 100 exhibits adequate accuracy and performance. The mounting assembly 108, which will now be described in more detail, is configured to adjust the position of the stator 104 relative to the rotor element 102, and along three perpendicular axes—a first axis 118, a second axis 122, and a third axis 124 (into and out of the page).

Figure 3:
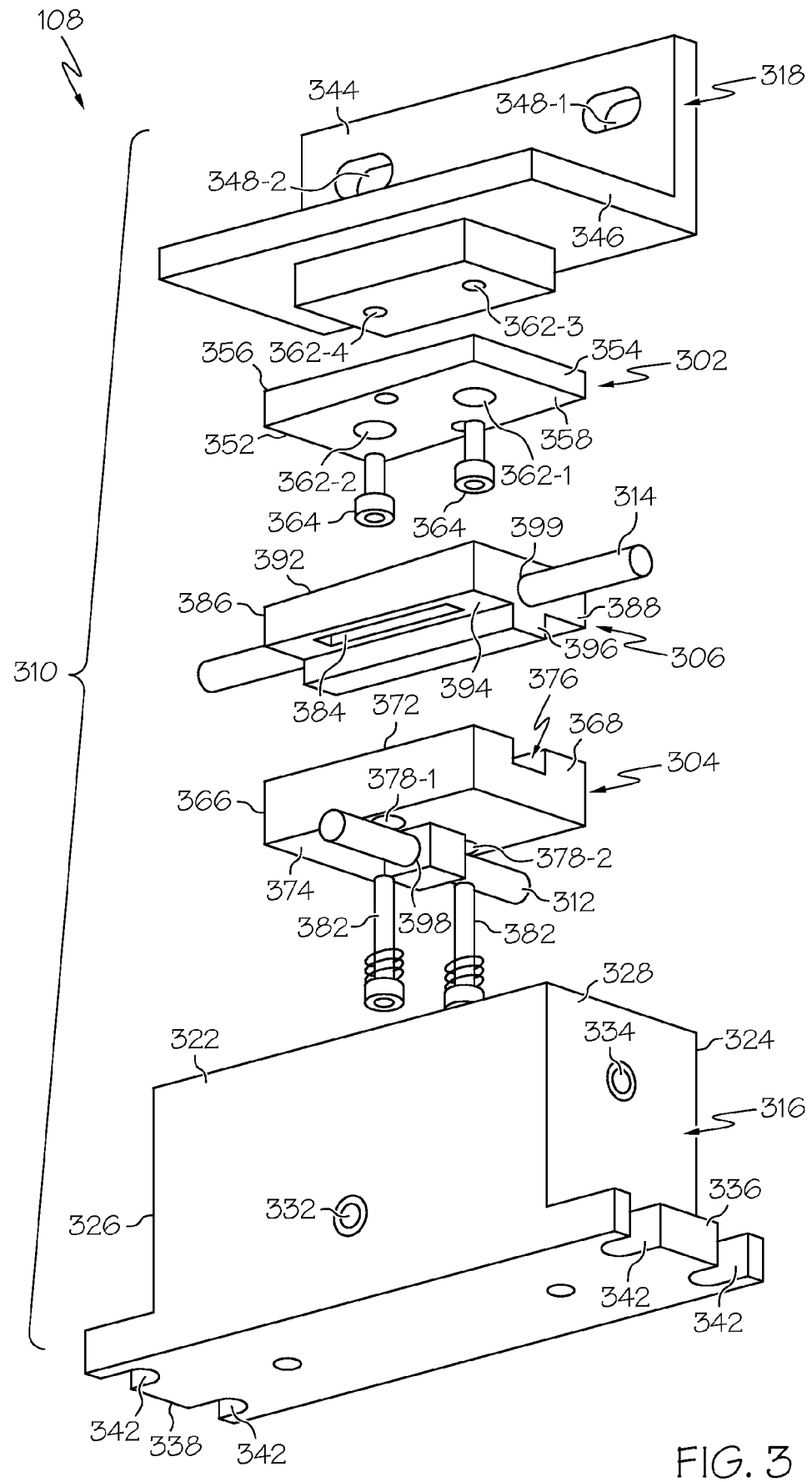
FIG. 3 depicts an exploded view of one embodiment of the mounting assembly that may be used with the torque measurement system of FIG. 1.
Figure 4:
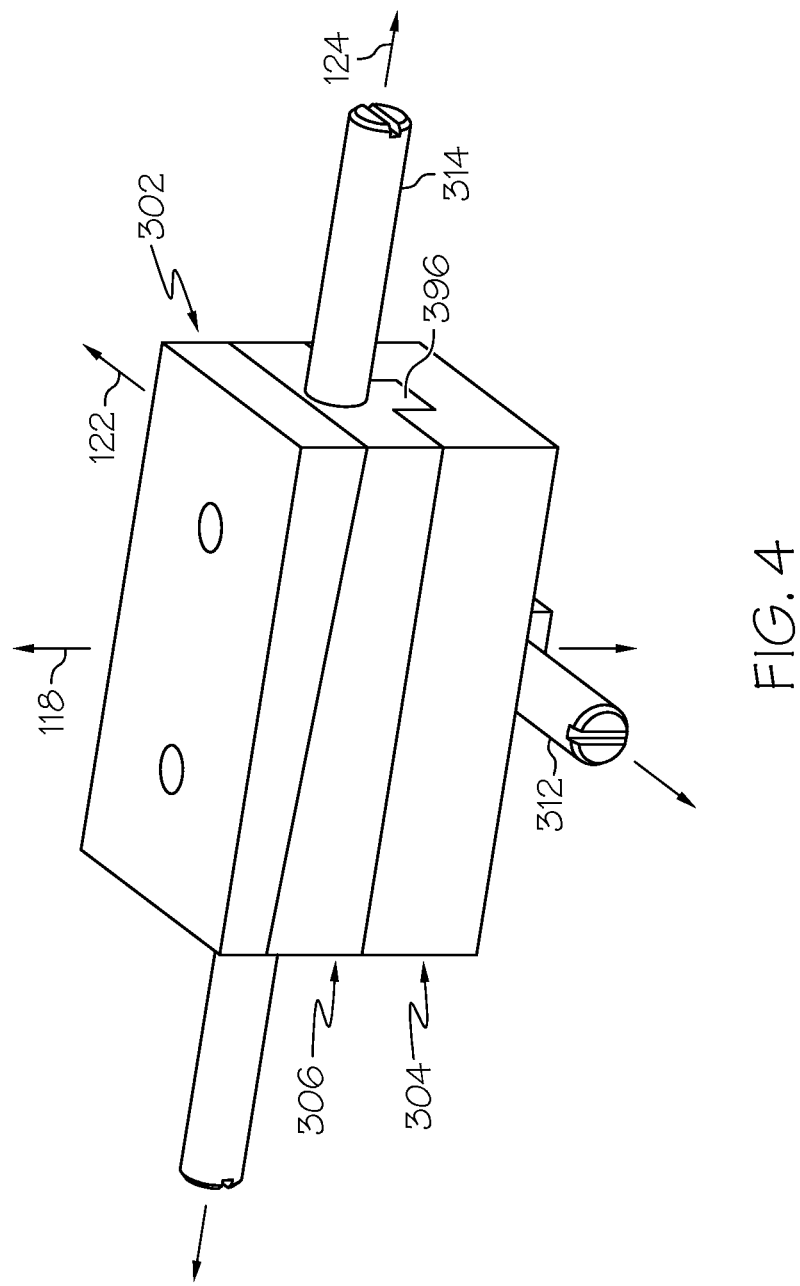
FIG. 4 depicts a plan view of a portion of the mounting assembly depicted in FIG. 3.
Figure 7:
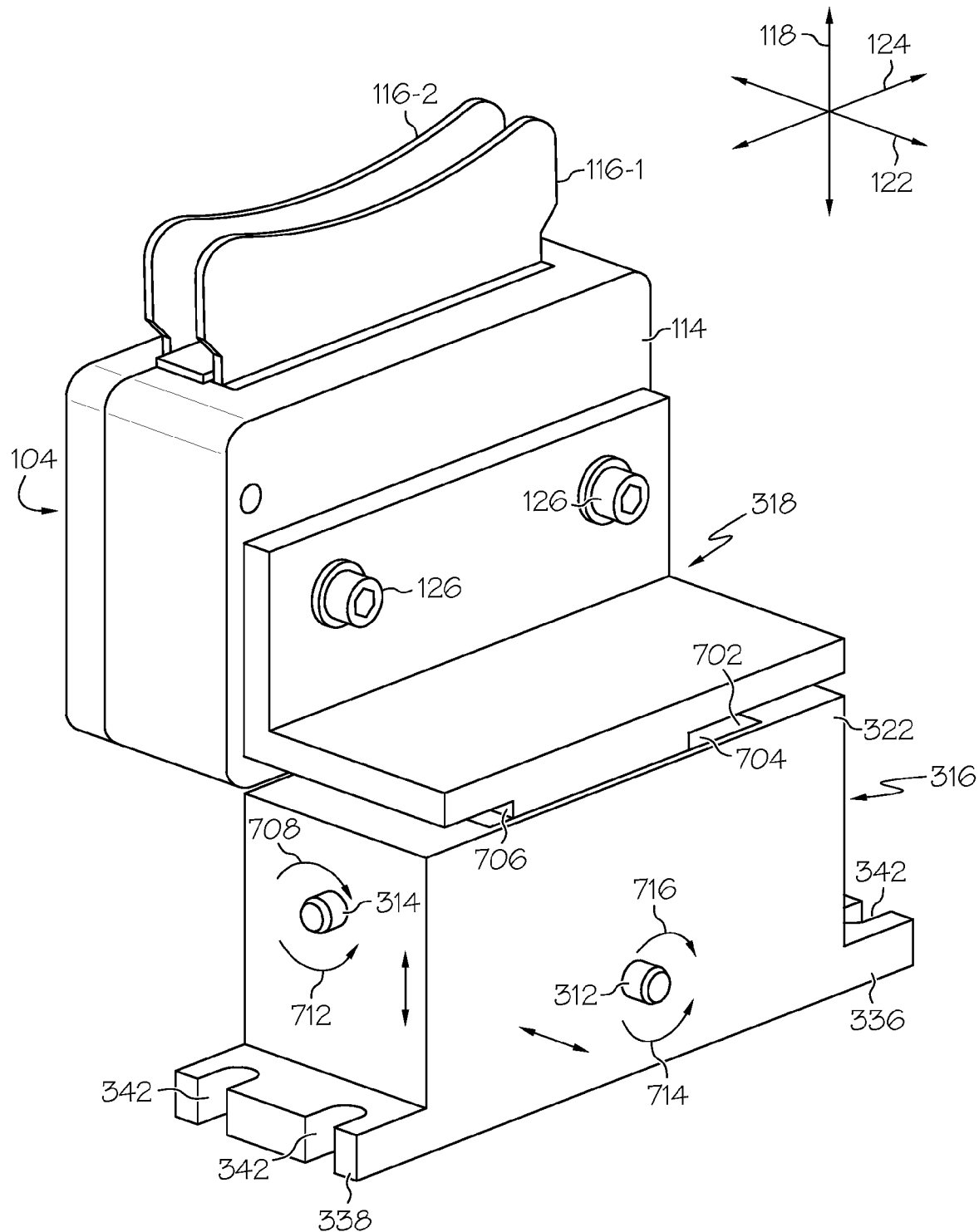
FIG. 7 depicts a plan view of the mounting assembly depicted in FIG. 3.

To implement the above-described function, the depicted mounting assembly 108, as shown more clearly in FIGS. 3 and 4, includes a first adjustment block 302, a second adjustment block 304, and a third adjustment block 306, all disposed within a housing assembly 310. The mounting assembly 108 additionally includes a first adjustment device 312 and a second adjustment device 314. The housing assembly 310 may be variously configured, but in the depicted embodiment it includes a housing 316 and a mounting bracket 318. The housing 316 may also be variously configured, but in the depicted embodiment it includes a front wall 322, a back wall 324, a first side wall 326, a second side wall 328, an inner surface 702 that defines an inner volume 704, and an opening 706 into the inner volume 704 (see FIG. 7). The front and back walls 322, 324 each include first adjustment device openings 332, and the first and second side walls 326, 328 each include second adjustment device openings 334. As FIGS. 1 and 7 depict, the ends of the first and second adjustment devices 312, 314 extend from the first and second adjustment device openings 332, 334, respectively. The first and second adjustment devices 312, 314 are mounted within the first and second adjustment device openings 332, 334, respectively. The first and second adjustment devices 312, 314 are preferably mounted such that the first adjustment device 312 may rotate about, but not translate along, the second axis 122, and such that the second adjustment device 314 may rotate about, but not translate along, the third axis 124. Various mounting hardware may be used to provide this functionality. In the depicted embodiment, C-clips are disposed in each of the openings 332, 334. The housing 316 additionally includes a first mount flange 336 and a second mount flange 338. The first and second mount flanges 336, 338 each include a plurality of elongate openings 342. The elongate openings 342 are each configured to receive suitable mounting hardware (non-illustrated), which is used to mount the housing 316 against movement.

The mounting bracket 318 is disposed over the opening 706 in the housing 316, and may extend at least partially into the inner volume 704. The mounting bracket 318 includes a mount plate 344 and a base plate 346. The mount plate 344 extends perpendicularly from the base plate 346 and includes a plurality of elongate fastener openings 348 (348-1, 348-2). As is depicted in FIGS. 1 and 7, the mount plate 344 is coupled to the stator 104 via a plurality of fasteners 126 that extend, one each, through different ones of the elongate fastener openings 348. The mount plate 344, as will be described momentarily, is coupled to the first adjustment block 304.

When assembled as depicted in FIG. 4, and properly mounted within and to the housing assembly 310, the first adjustment block 302 is movable along the first axis 118 and the second axis 122, and is mounted against movement along the third axis 124. The second adjustment block 304 is coupled to the first adjustment block 302, is movable along the second axis 122, and is mounted against movement along the first 118 and third 124 axes. And the third adjustment block 306 is disposed between the first adjustment block 302 and the second adjustment block 304, is movable along the second 122 and third 124 axes, and is mounted against movement along the first axis 118. In addition to this relative physical configuration, the first 302, second 304, and third 306 adjustment blocks are configured such that the first adjustment block 302 moves along the first axis 118 in response to movement of the third adjustment block 306 along the third axis 124, and the first 302 and third 306 adjustment blocks simultaneously move along the second axis 122 in response to and with movement of the second adjustment block 304 along the second axis 122.

The movement of the second 304 and third 306 adjustment blocks described above is facilitated by the first 312 and second 314 adjustment devices, respectively. In particular, the first adjustment device 312 is configured to selectively move the second adjustment block 304 along the second axis 122 relative to the housing 316, and the second adjustment device 314 is configured to selectively move the third adjustment block 306 along the third axis 124 relative to the housing 316. To do so, the first adjustment device 312 is coupled to the second adjustment block 304 and to the housing 316, and extends along the second axis 122. The second adjustment device 314 is coupled to the third adjustment block 306 and to the housing 316, and extends along the third axis 124. The particular manner in which the first 302, second 304, and third 306 adjustment blocks, and the first 312 and second 314 adjustment devices are configured to implement this functionality, in accordance with one embodiment, will now be described.

The first adjustment block 302 includes a first end 352, a second end 354, a top surface 356, and a bottom surface 358. The first adjustment block 302 is tapered from its first end 352 to its second end 354, and includes a plurality of first fastener openings 362 (362-1, 362-2) that extend between the top and bottom surfaces 356, 358. A plurality of first fasteners 364 extend, one each, through different ones of the first fastener openings 362 in the first adjustment block 302, and into different first fastener openings 362 (362-3, 362-4) in the base plate 346. The first fasteners 364, as may be appreciated, are used to couple the first adjustment plate 304 to the base plate 346. As noted above, the first adjustment block 302 is also coupled to the second adjustment block 304.

The second adjustment block 304 includes a first end 366, a second end 368, a top surface 372, and a bottom surface 374. A groove 376 is formed in the top surface 372 and extends between the first and second ends 366, 368. The second adjustment block 304 additionally includes a plurality of second fastener openings 378 (378-1, 378-2) that extend between the top and bottom surfaces 372, 374. A plurality of spring-loaded second fasteners 382 extend, one each, through different ones of the second fastener openings 378 in the second adjustment block 304, and into different second fastener openings 378 (378-3, 378-4) that are formed in the first adjustment block 302, via different fastener slots 384 (only one visible in FIG. 3) that are formed in the third adjustment block 306.

The third adjustment block 306, in addition to the fastener slots 384, includes a first end 386, a second end 388, a top surface 392, and a bottom surface 394. Similar to the first adjustment block 302, the third adjustment block 306 is tapered. However, it is tapered in a manner that is opposite to the first adjustment block 302. That is, the third adjustment block 306 is tapered from its second end 388 to its first end 386. The third adjustment block 306 additionally has a protrusion 396 formed on its bottom surface 394 that extends between its first and second ends 386, 388. The protrusion 396 is disposed within the groove 376 that is formed in the top surface of the second adjustment block 304.

In addition to the structural features described above, the second adjustment block 304 includes a first adjustment device opening 398, and the third adjustment block 306 includes a second adjustment device opening 399. The first adjustment device opening 398 in the second adjustment block 304 is configured to receive the first adjustment device 312, and the second adjustment device opening 399 in the third adjustment block 306 is configured to receive and the second adjustment device 314. More specifically, the depicted first and second adjustment devices 312, 314 each have an outer surface that is at least partially threaded. The first adjustment device opening 398 in the second adjustment block 304 has a threaded inner surface that mates with the threads on the outer surface of the first adjustment device 312. Similarly, the second adjustment device opening 399 in the third adjustment block 306 has a threaded inner surface that mate with the threads on the outer surface of the second adjustment device 314.

Figure 5:
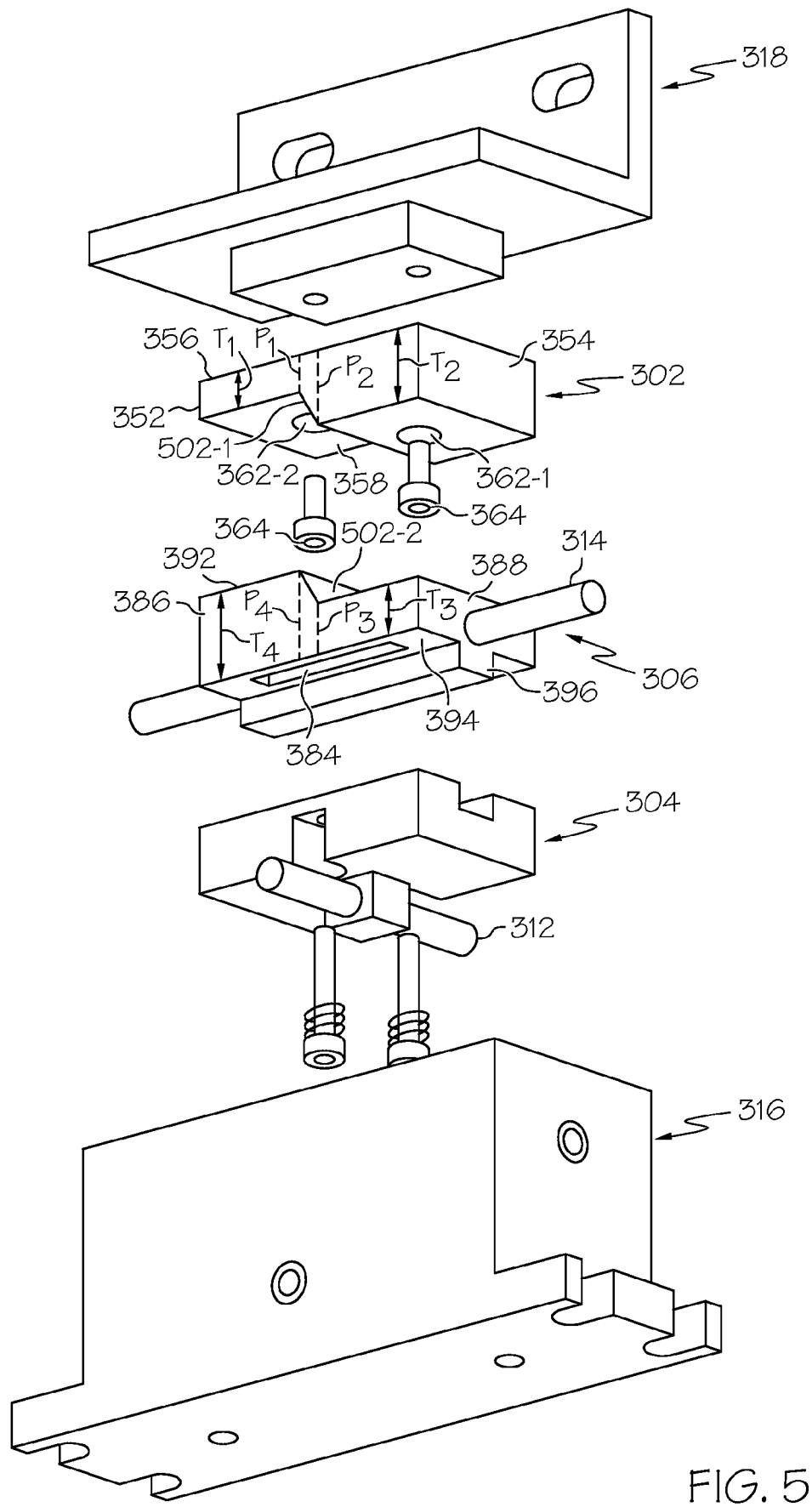
FIG. 5 depicts an exploded view of another embodiment of the mounting assembly that may be used with the torque measurement system of FIG. 1.
Figure 6:
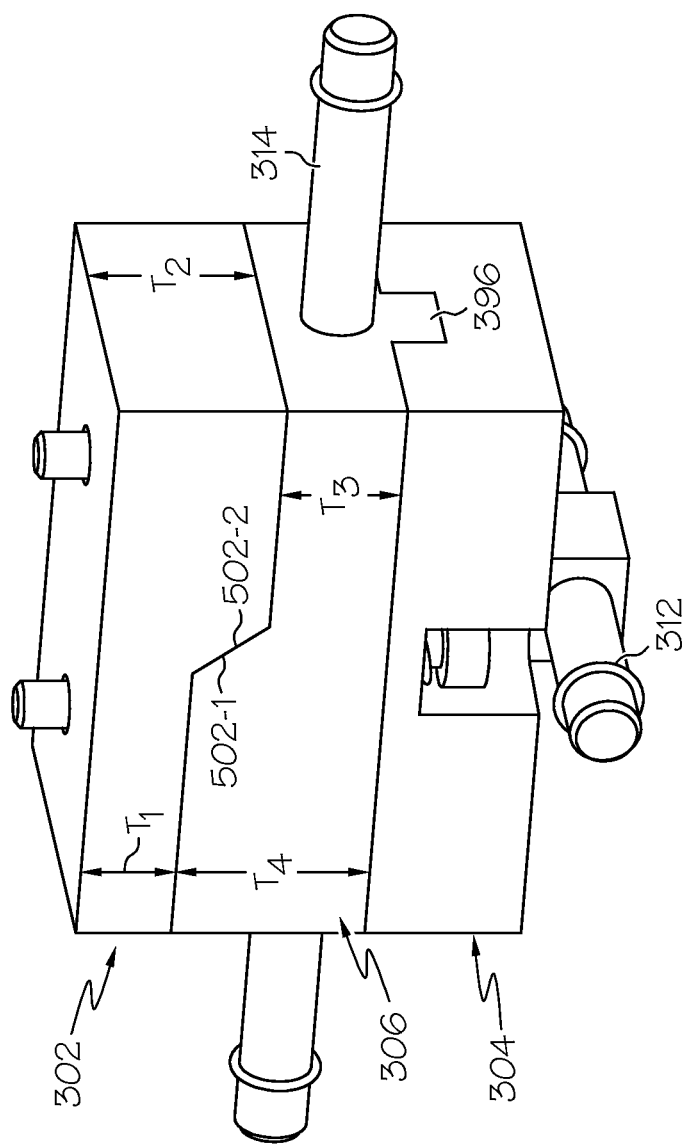
FIG. 6 depicts a plan view of a portion of the mounting assembly depicted in FIG. 5.

The above-described configuration of the first 302 and third 306 adjustment blocks is merely exemplary of one configuration. In accordance with another exemplary embodiment, which is depicted in FIGS. 5 and 6, and as will now be described, the first 302 and third 306 adjustment blocks may be configured slightly different. Before doing so, however, it is noted that most (if not all) of the other structural elements and features of this alternative embodiment of the mounting assembly 108 are the same as those that are depicted in FIGS. 3 and 4, and were described above. As such, descriptions of these structural elements and features will not be repeated. Moreover, like structural elements and features of the two embodiments are referenced using like reference numerals.

As with the first embodiment, the first adjustment block 302 of this alternative embodiment is coupled to the second adjustment block 304, and includes a first end 352, a second end 354, a top surface 356, and a bottom surface 358. It additionally includes a plurality of first fastener openings 362 (362-1, 362-2) that extend between the top and bottom surfaces 356, 358. Moreover, a plurality of first fasteners 364 extend, one each, through different ones of the first fastener openings 362 in the first adjustment block 302, and into different first fastener openings 362 (362-3, 362-4) in the base plate 346, to couple the first adjustment plate 304 to the base plate 346. The third adjustment block 306 of this alternative embodiment is also similar in many respects to that of the first in that it includes a first end 386, a second end 388, a top surface 392, and a bottom surface 394. The third adjustment block 306 additionally has the fastener slots 384, and the protrusion 396 formed on its bottom surface 394 that extends between its first and second ends 386, 388, and that is disposed within the groove 376 that is formed in the top surface of the second adjustment block 304.

Although many features of the first 302 and third 306 adjustment blocks of this alternative embodiment are similar (if not identical) to those of the first embodiment, these adjustment blocks 302, 306 are not tapered between their first and second ends. Instead, the first 302 and third 306 adjustment blocks are configured with mating ramped sections on their bottom 358 and top 392 surfaces, respectively. More specifically, the first adjustment block has a first thickness ($T_1$) between its top surface 356 and its bottom surface 358 that extends from its first end 352 to a first position ($P_1$), and a second thickness ($T_2$) between its top surface and its bottom surface that extends from its second end 354 to a second position ($P_2$). As may be readily apparent, the first thickness ($T_1$) is less than the second thickness ($T_2$). The bottom surface 358 additionally defines a first ramped section 502-1 that extends between the first position ($P_1$) and the second position ($P_2$). The third adjustment block has a third thickness ($T_3$) and a fourth thickness ($T_4$) between its top surface 392 and its bottom surface 394, with the fourth thickness ($T_4$) being greater than the third thickness ($T_3$). The third thickness ($T_3$) extends from the second end 388 of the third adjustment block 306 to a third position ($P_3$), and the fourth thickness ($T_4$) extends from the first end 386 of the third adjustment block 306 to a fourth position ($P_4$). The bottom surface 394 of the third adjustment block 306 defines a second ramped section 502-2 that extends between the third position ($P_3$) and the fourth position ($P_4$). It will be appreciated that in some embodiments, the first and third thicknesses may be equal and the second and fourth thicknesses may be equal; however, this is not necessary. However, the distance between the first and second positions is preferably equal to the distance between the third and fourth positions. Moreover, the heights and slopes of the first and second ramp sections 502-1, 502-2 are preferably equal.

Having described the structural configuration of the mounting assembly 108, the manner in which a user may precisely adjust the mounting assembly 108, and thus the position of the stator 104, will now be described. In doing so, reference should now be made to FIG. 7. To adjust the position of the stator 108 along the first axis 118 (i.e., upward or downward in FIG. 7), a user will rotate the second adjustment device 314 in either a first rotational direction 708 or a second rotational direction 712, depending upon the desired translational direction. In the depicted embodiment, rotating the second adjustment device 314 in the first rotational direction 708 will move the stator 104 upward, and rotating the second adjustment device 314 in the second rotational direction 712 will move the stator 104 downward. This is because the second adjustment device 314 is mounted against translational movement along the third axis 124. Thus, rotating the second adjustment device 314 causes the third adjustment block 306 to translate along the third axis 124. The first and third adjustment blocks 302, 306 are tapered in opposing directions, with the first end 352 of the first adjustment block 302 disposed adjacent the first end 386 of the third adjustment block 306, and the fastener slots 384 in the third adjustment block 306 are configured to allow the third adjustment block 306 to move relative to the first and second adjustment blocks 302, 304. Thus, movement of the third adjustment block 306 along the third axis 124 causes the first adjustment block 302 to move along the first axis 118.

To adjust the position of the stator 108 along the second axis 122 (i.e., rearward or forward in FIG. 7), a user will rotate the first adjustment device 312 either a third rotational direction 714 or a fourth rotational direction 716, depending upon the desired translational direction. In the depicted embodiment, rotating the first adjustment device 312 in the third rotational direction 714 will move the stator 104 rearward, and rotating the second adjustment device 314 in the fourth rotational direction 716 will move the stator 104 forward. This is because the first adjustment device 312 is mounted against translational movement along the second axis 122. Thus, rotating the first adjustment device 312 causes the second adjustment block 304 to translate along the second axis 122. Because the second adjustment block 304 is coupled to both the first adjustment block 302 and the third adjustment block 306, all three adjustment blocks 302-306, and concomitantly the stator 104, simultaneously move together along the second axis 122.

As noted above, the first and second mount flanges 336, 338 on the housing 316 include a plurality of elongate openings 342 that are configured to receive suitable mounting hardware. The elongate openings 342 allow the position of the housing 316, and thus the stator 104, to be adjusted along the third axis 124, and then clamped using suitable mounting hardware.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A torque measurement system, comprising:
a rotor element configured to mount on a rotating shaft, the rotor element further configured to sense torque generated by the rotating shaft and generate and supply radio frequency (RF) signals representative of the sensed torque;
a signal processing module coupled to receive and process signals representative of the sensed torque;
a stator coupled to the signal processing module and in wireless communication with the rotor element; and
a mounting assembly coupled to the stator and configured to adjust the position thereof relative to the rotor element and along first, second, and third perpendicular axes, the mounting assembly comprising:
a first adjustment block movable along the first axis and the second axis and mounted against movement along the third axis;
a second adjustment block coupled to the first adjustment block, the second adjustment block movable along the second axis and mounted against movement along the first and third axes;
a third adjustment block disposed between the first adjustment block and the second adjustment block, the third adjustment block movable along the second and third axes and mounted against movement along the first axis,
wherein:
the first adjustment block and stator move along the first axis in response to movement of the third adjustment block along the third axis, and
the first adjustment block, the third adjustment block, and the stator simultaneously move along the second axis in response to and with movement of the second adjustment block along the second axis.

2. The torque measurement system of claim 1, wherein:
the mounting assembly further comprises a housing assembly within which the first, second, and third adjustment blocks are disposed; and
the housing assembly comprises:
a housing having an inner surface that defines an inner volume, and an opening into the inner volume; and
a mounting bracket disposed over the opening and coupled to the stator.

3. The torque measurement system of claim 2, further comprising:
a first adjustment device coupled to the second adjustment block and to the housing, the first adjustment device extending along the second axis and configured to selectively move the second adjustment block along the second axis relative to the housing; and
a second adjustment device coupled to the third adjustment block and to the housing, the second adjustment device extending along the third axis and configured to selectively move the third adjustment block along the third axis relative to the housing.

4. The mounting assembly of claim 3, wherein:
the first and second adjustment devices each comprise a threaded outer surface;
the housing comprises a plurality of first adjustment device openings and a plurality of second adjustment device openings;
the second adjustment block comprises a first adjustment device opening;
the third adjustment block comprises a second adjustment device opening;
the first adjustment device opening in the second adjustment block has a threaded inner surface that mates with the threaded outer surface of the first adjustment device; and
the second adjustment device opening in the third adjustment block has a threaded inner surface that mates with the threaded outer surface of the second adjustment device.

5. The torque measurement system of claim 1, wherein:
the first adjustment block and the third adjustment block each comprise a first end and a second end;
the first adjustment block is tapered from its first end to its second end;
the third adjustment block is tapered from its second end to its first end; and
the first end of the first adjustment block is disposed adjacent the first end of the second adjustment block.

6. The mounting assembly of claim 1, wherein:
the first adjustment block and the third adjustment block each comprise a first end, a second end, a top surface, and a bottom surface;
the first adjustment block has (i) a first thickness between its top surface and its bottom surface that extends from its first end to a first position (ii) a second thickness between its top surface and its bottom surface that extends from its second end to a second position, and (iii) a first ramped section on the bottom surface that extends between the first position and the second position; and
the third adjustment block has (i) a third thickness between its top surface and its bottom surface that extends from its second end to a third position (ii) a fourth thickness between its top surface and its bottom surface that extends from its first end to a fourth position, and (iii) a second ramped section on the bottom surface that extends between the third position and the fourth position,
the first end of the first adjustment block is disposed adjacent the first end of the second adjustment block;
the first thickness is less than the second thickness; and
the third thickness is less than the fourth thickness.

7. The torque measurement system of claim 1, wherein:
the first and second adjustment blocks each comprise a plurality of fastener openings;
the third adjustment block comprises a plurality of fastener slots;
the mounting assembly further comprises a plurality of fasteners, each fastener extending into one of the fastener openings in each of the first and second adjustment blocks and through one of the fastener slots in the third adjustment block; and
the fastener slots in the third adjustment block are configured to allow the third adjustment block to move along the third axis relative to the first and second adjustment.

8. The torque measurement system of claim 1, wherein:
the second adjustment block comprises a first end, a second end, and a groove that extends between its first and second ends;
the third adjustment block comprises a first end, a second end, and a protrusion that extends between its first and second ends; and
the protrusion is disposed within the groove.

9. A torque measurement system, comprising:
a rotor element configured to mount on a rotating shaft, the rotor element further configured to sense torque generated by the rotating shaft and generate and supply radio frequency (RF) signals representative of the sensed torque;

a signal processing module coupled to receive and process signals representative of the sensed torque;

a stator coupled to the signal processing module and in wireless communication with the rotor element; and a mounting assembly coupled to the stator and configured to adjust the position of the stator relative to the rotor element and along first, second, and third perpendicular axes, the mounting assembly comprising:

a housing mounted against movement, the housing having an inner surface that defines an inner volume, and an opening into the inner volume;

a mounting bracket coupled to the stator, the mounting bracket disposed over the opening and movable relative to the housing;

a first adjustment block disposed within the inner volume of the housing and coupled to the mounting bracket, the first adjustment block movable along the first axis and the second axis and mounted against movement along the third axis;

a second adjustment block disposed within the inner volume of the housing and coupled to the first adjustment block, the second adjustment block movable along the second axis and mounted against movement along the first and third axes;

a third adjustment block disposed within the inner volume of the housing and between the first adjustment block and the second adjustment block, the third adjustment block movable along the second and third axes and mounted against movement along the first axis, wherein:

the first adjustment block, the mounting bracket, and stator move along the first axis in response to movement of the third adjustment block along the third axis, and the first adjustment block, the third adjustment block, the mounting bracket, and the stator simultaneously move along the second axis in response to and with movement of the second adjustment block along the second axis.

10. The torque measurement system of claim 9, further comprising:

a first adjustment device coupled to the second adjustment block and to the housing, the first adjustment device extending along the second axis and configured to selectively move the second adjustment block along the second axis relative to the housing; and a second adjustment device coupled to the third adjustment block and to the housing, the second adjustment device extending along the third axis and configured to selectively move the third adjustment block along the third axis relative to the housing.

\* \* \* \* \*